United States Patent [19]
>
> May et al.
>
> [11] Patent Number: 5,022,034
>
> [45] Date of Patent: Jun. 4, 1991

[54] LASER DEVICE, INCLUDING CONTROL OF POLARIZATION MODE

[76] Inventors: A. D. May, 436 Palmerston Blvd., Toronto, Ontario, Canada, M6G 2N8; G. Stephan, 26 Chemin de Quovadis 22, Tregastel, France

[21] Appl. No.: 371,894

[22] Filed: Jun. 27, 1989

[51] Int. Cl.$^5$ ............................................. H01S 3/10
[52] U.S. Cl. .................................. 372/26; 372/32; 372/97; 372/106; 372/27
[58] Field of Search ................. 372/92, 29, 32, 26–28, 372/97, 106

[56] References Cited

U.S. PATENT DOCUMENTS

| | | | |
|---|---|---|---|
| 3,418,476 | 12/1968 | Müller et al. | |
| 3,918,007 | 11/1975 | Waksburg | 372/97 |
| 4,104,598 | 8/1978 | Abrams | 372/106 |
| 4,305,046 | 12/1981 | Le Floch et al. | 372/27 |
| 4,468,772 | 8/1984 | Oudar | 372/50 |
| 4,484,333 | 11/1984 | Chenansky et al. | 372/97 |
| 4,498,179 | 2/1985 | Wayne et al. | 372/27 |
| 4,503,541 | 3/1985 | Weller et al. | 372/50 |
| 4,549,300 | 10/1985 | Mitsuhashi et al. | 372/106 |
| 4,637,027 | 1/1987 | Shiraski et al. | 372/27 |
| 4,653,056 | 3/1987 | Baer et al. | 372/27 |
| 4,656,635 | 4/1987 | Baer et al. | 372/27 |
| 4,674,100 | 6/1987 | Koboyashi | 372/50 |
| 4,675,518 | 6/1987 | Oimura et al. | 372/50 |
| 4,716,444 | 12/1987 | Mangeon et al. | 372/32 |
| 4,723,249 | 2/1988 | Ouhayoun | 372/32 |
| 4,734,912 | 3/1988 | Scerbak et al. | 372/27 |
| 4,740,986 | 4/1988 | Reeder | 372/92 |
| 4,791,633 | 12/1988 | Esherick et al. | 372/32 |
| 4,835,933 | 8/1989 | Blow et al. | 372/97 |

FOREIGN PATENT DOCUMENTS

| | | |
|---|---|---|
| 973958 | 9/1975 | Canada . |
| 1017046 | 9/1977 | Canada . |
| 1057841 | 7/1979 | Canada . |
| 1136748 | 11/1982 | Canada . |
| 1163702 | 3/1984 | Canada . |
| 1213345 | 10/1986 | Canada . |

OTHER PUBLICATIONS

Stephan et al., "Competition Effects in the Polarization of Light in a Quasi-isotropic Laser", Aug., 1987.
Stephan et al., "Effects de Competition dans la Polarisation de la Lumiére d'un Laser Quasi-isotrope", Dec., 1987.
Stephan et al., "Light Polarization of a Quasi-isotropic Laser with Optical Feedback", Aug., 1985.
Lamb, "Theory of an Optical Maser", Jun., 1964.
May et al., "Stability of Polarized Modes in a Quasi-isotropic Laser", unpublished?
May et al., "Polarization Dynamics in a Quasi-isotropic Laser", Jun., 1989.
Paddon et al., "Comportement Catastophique du Domaine de Bistabilite d'un Laser Vectoriel", unpublished?
Ropars et al., "Polarization Slaving Mechanisms in Vectorial Bistable Lasers", May, 1987.
De Lang et al., "Saturation Induced Anisotropy in a Gaseous Medium in Zero Magnetic Field", Dec. 1965.
Andreyeva et al., "Polarization of Radiation from a Single Frequency Helium-neon Laser", 1969.

(List continued on next page.)

Primary Examiner—Frank Gonzalez
Attorney, Agent, or Firm—Rogers, Bereskin & Parr

[57] ABSTRACT

A laser device includes a resonant cavity with a gain medium therein, and first and second reflectors at either end, to form a quasi-isotropic laser. A feedback section is formed between the second reflector and a third reflector. A polarizer and modifier are provided in the feedback section. The polarizer and modifier can modify a variety of parameters, for example the polarization, phase, intensity or frequency of the feedback. The light feedback into the resonant cavity has an intensity much less than that within the resonant cavity, but sufficient to overcome any residual anisotropies. Control of the modifier causes the device to be operated in one of two or more polarization modes.

15 Claims, 3 Drawing Sheets

OTHER PUBLICATIONS

Gioggia et al., "Anomalous Mode Pulling, Instabilites, and Chaos in a Single-mode, Standing-wave 3.39 μm He-Ne Laser", Mar., 1984.

Hendow et al., "Observation of Bistable Behavoir in the Polarization of a Laser", Aug., 1982.

Chen et al., "Polarization Bistability in Semiconductor Lasers", Jan., 1985.

Dutta et al., "Effect of Stress on the Polarization of Stimulated Emission from Injection Lasers", Jul., 1984.

Liu et al., "Digital Optical Signal Processing with Processing with Polarization-Bistable Semiconductor Lasers", Apr., 1985.

Kawaguchi et al., "A New Class of Instabilites in a Diode Laser with an External Cavity", Nov., 1984.

Mitsuhashi, "Polarization Control of an Antireflection-coated GaAIAs Laser Diode by an External Optical Feedback", Dec., 1982.

LASER DEVICE, INCLUDING CONTROL OF POLARIZATION MODE

FIELD OF THE INVENTION

This invention relates to a laser device, and more particularly relates to a laser device in which the polarization of the laser output can be controlled and switched.

BACKGROUND OF THE PRESENT INVENTION

At the present time, there are a wide variety of different laser types or devices known, which are employed for a variety of uses. One suggested use is for communication purposes. Lasers offer two potential advantages, namely the availability of a large oscillating band width and hence the possibility of transmitting a large amount of information, and secondly the small wavelength of a laser gives a very small degree of divergence, approximately 10,000 times smaller than microwaves. However, the beams provided by lasers are strongly attenuated in the atmosphere under conditions of poor visibility. Nonetheless, in optical fiber systems, there is the possibility of transmitting a large amount of information.

There is also the problem of encoding the information into the laser beam. Various techniques have been proposed for modulating the laser beam. For transmitting information or data digitally, it has been proposed to provide some means for switching the laser on and off. This however, can lead to frequency chirping, since the laser is not running continuously. Ideally, a laser should be running continuously, so that it reaches a steady temperature etc., and then the frequency is steady.

Another technique is to couple the output of the laser through an electro-optic device capable of varying the degree of polarization given to the light. An example of this is a Pockels cell, provided with crossed polarizers at either end. The induced birefringence of the crystal varies with the applied electric field. Thus, by switching the electric field, one can switch the polarization of the light leaving the crystal. The effect of the polarizers is then to determine whether the beam is transmitted through or not. This thus enables the light beam to be modulated. However, such crystals do require a very large voltage to be applied to achieve the necessary polarization effects. Typically, voltages of the order of hundreds of volts have to be applied, and even then the crystals are of substantial dimensions. In modern communications equipment where compact integrated circuit components are common operating at low voltages, such an arrangement is unacceptable.

U.S. Pat. No. 4,498,179 to Wayne et al shows a somewhat similar type of arrangement. Here, a modulator is provided in a coupled cavity and is controlled so as to determine whether radiation is transmitted out of the coupled cavity or not. Here, a large voltage would be necessary to operate the modulator. It is also noteworthy that the gain cell itself is provided with Brewster windows to make it heavily anisotropic, whereby it operates in a selected polarization mode. Another well known technique for controlling the operation of a laser, to achieve a pulsed operation which can be used for communication purposes is Q-switching. Effectively, one controls the characteristics of the resonant cavity so that it is switched from a state in which laser action cannot occur, to a state in which laser action can occur. Assuming the gain medium has been pumped to achieve a large population inversion, the stored energy is released as a short burst of radiation.

Reeder U.S. Pat. No. 4,740,986 is an example of a laser resonator that relies upon Q-switching. It includes an electro-optics crystal, which is a Kerr or Pockels cell. This has to provide a quarter-wave effect, and again a large voltage would be necessary to achieve this.

Conventional teaching in the field of lasers is that it is impossible to control the polarization of a quasi-isotropic laser by feedback. Experiments with various lasers have resulted in chaotic or unstable behaviour, which current theories, based on intensity competition, have been unable to explain. It is currently a widely held belief that attempt of any sort to control feedback into a quasi-isotropic laser will merely result in this chaotic behaviour and should be avoided. Thus, many lasers are deliberately designed to be anisotropic, e.g. by the use of Brewster windows, so that the polarization of the radiation is carefully controlled. Clearly, once a laser is made anisotropic, it is not possible to cause the plane of a polarization to switch within the laser itself. Alternatively, it has been common to design laser devices, to eliminate any feedback or at least reduce it to the lowest level possible.

More recently, various semiconductor lasers have been developed. Generally, these are strongly anisotropic. Typically, the actual resonant cavity formed in the semiconductor has the configuration of a wave guide, which prevents any quasi-isotropic behaviour. Nonetheless, attempts have been made to control the polarization mode in a semiconductor laser.

An example can be found in U.S. Pat. No. 4,549,300 (Mitsuhashi et al). Here, adjacent to the semiconductor that provides the gain medium, there is located a controlling element with lenses on either side and a mirror. It is noteworthy that the ends of the semiconductor are coated with antireflection coatings, to reduce the reflectance to below 0.01. In other words, the controlling element, lenses etc. are effectively located with the gain medium in a single resonant cavity, rather than being in a separate section coupled to the main resonant cavity. It is noted that owing to the wave guide configuration of the semiconductor, the directions of polarization at which the laser output can normally assume are limited to the two directions parallel and perpendicular to the plane of the PN junction. By effectively providing in the resonant cavity a device that controls the plane of polarization, the overall device does indeed control the direction of polarization. In another embodiment, a lithium niobate crystal is used to control the polarization. It is noted that voltages as high as a kilovolt are necessary to cause the polarization to switch from one mode to another.

An earlier paper by the inventors, R.E. Mueller and B. Aissaoui, entitled Competition Effects in the Polarization of Light in a Quasi-Isotropic Laser (Journal of the Optical Society of America, Volume 4, No. 8, August 1987, page 1276) reported on experiments involving polarization competition in a quasi-isotropic helium neon laser. In one experiment, the different polarization modes yielded a crenellated line shape. In a second experiment, the internal anisotropies are determined by an inclined internal etalon, and dips and peaks were observed in the intensity of the laser. However, at that time, it had not been determined what level of feedback was necessary to cause the switching or what level was necessary for stable switching between the different modes. As detailed below, the speed at which switching could occur and a variable hysteresis effect in the switching behaviour were also totally unknown. It was not realized that in fact a small change in the feedback was necessary and could be effected by a small, compact modifier of intensity, phase or other parameter.

There is another semiconductor laser, where it has been found that some lasers produced according to a certain design show an instability between the two possible polarization modes. This is exploited by varying the current supplied. At one current level, the device operates at one polarization mode, and switches to the other polarization mode at a different current. This effect is not at all understood, and the frequency chirping problem is not entirely eliminated. The variation in current causes variations in the power and hence the frequency chirping.

What is desirable is a method of modulating a laser beam, so that digital information can be encoded onto the laser beam at a high bit rate. Preferably, the technique should be capable of being implemented in a semiconductor laser, using small, compact components operating at low voltages. This would then enable a small compact device to be made. The encoding technique should have fast switching to enable the high bit rate to be achieved. Further, the laser should preferably operate continuously, to avoid any frequency chirping effects, etc.

SUMMARY OF THE PRESENT INVENTION

In accordance with the present invention, there is provided a laser device comprising:

a resonant cavity having an optical axis and a first reflector means at one end thereof on said optical axis and a second reflector means at the other end thereof on said optical axis, the second reflector means permitting at least some radiation to pass therethrough;

a gain medium within the resonant cavity, the gain medium and the resonant cavity being substantially quasi-isotropic;

a polarizing means disposed on said optical axis outside the resonant cavity;

a modifying means for modifying at least one of the polarization, frequency, phase and intensity of radiation passing therethrough, located on the optical axis; and a third reflection means mounted on the optical axis with the modifying means and the polarizing means located between the second and the third reflection means, to form a feedback section comprising the polarizing means, the modifying means and the third reflection means, the reflectivity of the third reflection means being such that radiation reflected back into the resonant cavity from the third reflection means through the modifying means, the polarization means and the second reflection means provides feedback to the resonant cavity with an intensity substantially less than the intensity of radiation within the resonant cavity, and one of the first reflection means and the feedback section enabling radiation to be coupled out of the laser device;

wherein the strength of the anisotropy associated with the feedback into the resonant cavity is greater than any residual anisotropy of the gain medium and resonant cavity, but is not so great as to cause random behaviour within the device, whereby the feedback section can modify at least one of the polarization, frequency, phase and the intensity of radiation fed back into the resonant cavity to effect switching between modes in the resonant cavity, which are differentiated by their state of polarization.

BRIEF DESCRIPTION OF THE DRAWINGS

For a better understanding of the present invention and to show more clearly how it may be carried into effect, reference will now be made, by way of example, to the accompanying drawings in which.

DESCRIPTION OF THE PREFERRED EMBODIMENTS

Figure 1:
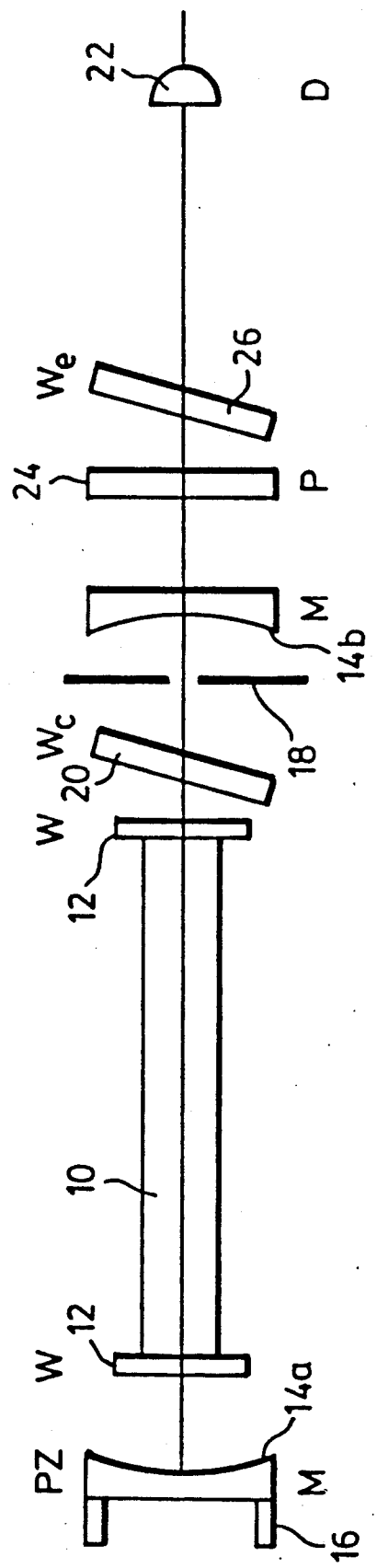
FIG. 1 is a schematic view of an experimental apparatus.

With reference to FIG. 1, an experimental apparatus included a helium neon laser 10 with antireflection coated windows 12 at either end. Mirrors 14 are provided, with one mirror indicated at 14a being mounted on piezo-electric mounts 16, so that the effective length of the laser cavity can be varied, to scan the gain profile of the laser. The actual laser tube 10 was thirty cm long and the spacing between the mirrors 14, which are concave was forty cm. An aperture 18 of an appropriate size then ensures that only one spatial mode is above the threshold, i.e. the laser operates on at most two modes of almost equal frequency and amplitude but different polarizations. An antireflection coated window 20, which still has some reflectivity, is located in the laser cavity to create a small anisotropic loss, the other components being otherwise quasi-isotropic. The window 20 is sufficiently thin that little phase variation occurs as the laser is scanned across its gain profile.

A second anisotropy was introduced by reflecting light from a detector 22 mounted outside the laser cavity. This light is reflected through a polarizer 24 and a further window 26, comparable to the window 20. Tilting the window 26 enables the phase shift to be varied. For a spacing between the detector 22 and mirror 14b of forty cm, scanning the laser over the gain profile produced a phase variation in the feedback in the order of two $\pi$ radians.

Experimentally, it was found that for the simplest case when the axes of the internal anisotropy determined by the window 20 and the effective anisotropy of the mirror 14b, and determined by the polarizer 24 and window 26, are parallel, then the laser device operates on a single linear polarization mode at any one time. The mode is either parallel or perpendicular to the axis of the polarizer 24.

Further details of the experimental technique and results can be found in the article entitled Competition Effects in the Polarization of Light in a Quasi-Isotropic Laser, cited above.

Figure 2:
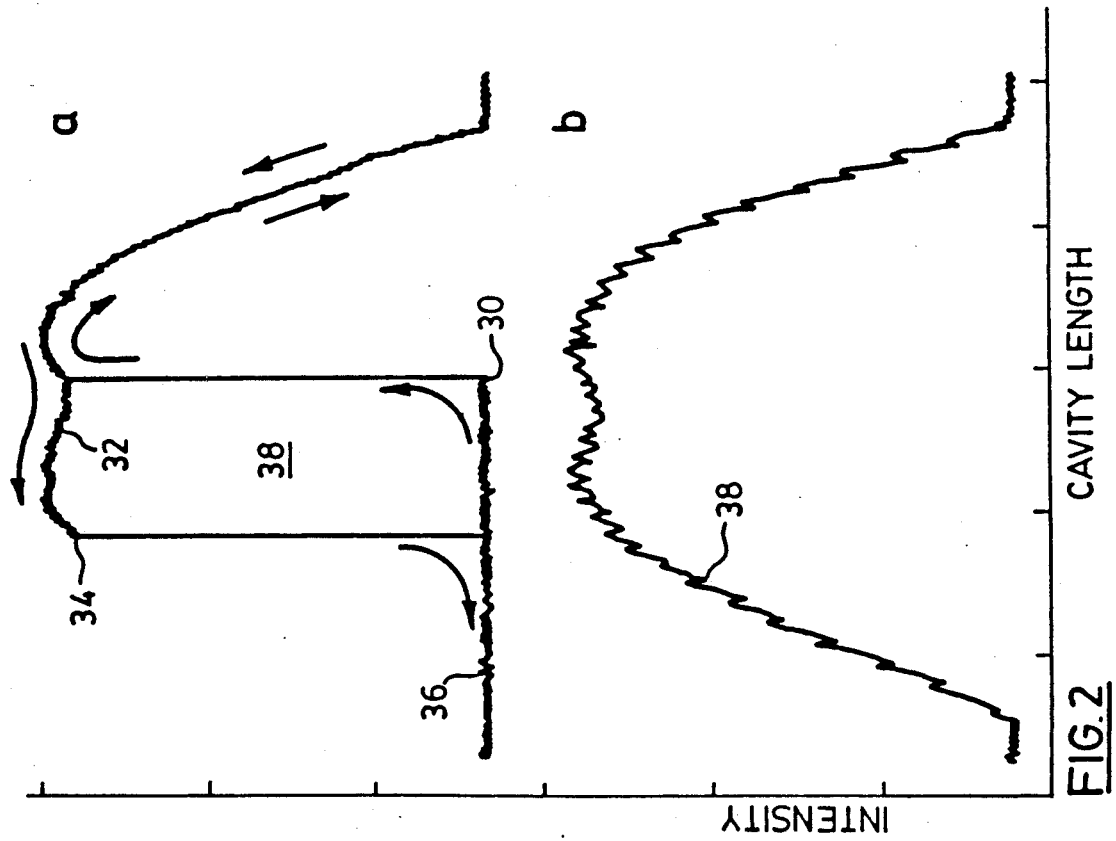
FIG. 2 is a graph showing variations of intensity with cavity length.

The experimental results shown in FIG. 2, where the intensity and cavity length are shown by arbitrary units, which are not necessarily the same for the two graphs a and b. The results for Graph a used a relatively short feedback section, whilst in Graph b a relatively long feedback section was used.

In the upper graph a of FIG. 2, as indicated by the arrows, as the cavity length is increased, the intensity in one polarization state remains zero until a point 30, when it switches abruptly to a high intensity level, and then proceeds to fall away again. When the cavity length is decreased, the intensity follows an upper curve 32 until a point 34 is reached, where the intensity falls off abruptly to the level 36. This gives a hysteresis loop indicated at 38.

FIG. 2B shows a curve 38, in which the total intensity was monitored instead of the intensity in one polarization state and feedback was provided by a long feedback path including a polarizer. Here, curve 38 displays a characteristic laser output curve with a superimposed half-wave-rectified weak modulation.

Now, applicants have developed a theory to explain the curves of FIG. 2, which is outlined below. The electric field for single mode has the following form:

$$\vec{E} = (\vec{E_+} + \vec{E_-})e^{-i(\omega t - kz)} - (\vec{E_+} + \vec{E_-})e^{-i(\omega t + kz)} + \text{c.c.}$$

This expression represents a field of arbitrary polarization and intensity, which is contained between two ideal isotropic mirrors. The parameters $\omega$, t, k and z have their usual meanings, with z being the axis of the laser. The right handed component, $$\vec{E_+} = E_+(x + iy)/\sqrt{2}$$

travels in the positive z direction and has the same amplitude as the left handed component travelling in a negative said direction. Both of these are designated by E+. The same is true for the other component of the field E−.

The field components can then be written as:

$$E_+ = \xi_+ e^{i(\phi + \phi_0/2)}, E_- = \xi_- e^{i(\phi - \phi_0/2)}$$

Further, to expose the amplitude and phase of the feedback, this is written as:

$\epsilon_f = \epsilon e^{i\phi_f}$.
where $\epsilon$ and $\phi_f$ are the strength and the phase of the feedback Then, assuming distributed cavity properties, one can determine the rate of change of the field components, and with some manipulation, the real and imaginary parts of the equations can be written as:

$\xi_+ = \xi_+[\alpha^r + \epsilon_w + \epsilon \cos \phi_f - \beta^r I_+ - \theta^r I_-] - \xi_-[\epsilon \cos (\phi_f - \phi_o) + \epsilon_w \cos \phi_o]$ $\xi_+ = \xi_-[\alpha^r + \epsilon_w + \epsilon \cos \phi_f - \beta^r I_- - \phi^r I_+] - \xi_+[\epsilon \cos (\phi_f + \phi_o) + \epsilon_w \cos \phi_o]$ $\xi_+ 30(\phi^{\cdot} + \phi^{\cdot}_o/2) = \xi_+[\alpha^i + \epsilon \sin \phi_f - \beta^i I_+ - \theta^i I_-] - \xi_-[\epsilon \sin (\phi_f - \phi_o) - \epsilon_w \sin \phi_o]$ $\xi_- 31(\phi^{\cdot} - \phi^{\cdot}_o/2) = \xi_-[\alpha^i + \epsilon \sin \phi_f - \beta^i I_- - \theta^i I_+] + \xi_+[\epsilon \sin (\phi_f + \phi_o) + \epsilon_w \sin \phi_o]$ In these equations, the following definitions apply: $\alpha = \alpha^r + i\alpha^i$ is the complex low signal net gain, and $\beta$ and $\theta$, complex quantities describing the self and cross saturation between components of the field; $\phi$ is the mean phase and $\phi_o$ the differential phase between the two components of a single mode; $\epsilon_w$ arises from the anisotropic transmission of the thin intracavity mirror 20; $I_\pm$ is the intensity of each component.

By inspection, there are two steady state solutions to these equations, both with $\xi_+ = \xi_-$ and $\phi^{\cdot} = 0$. One solution, A, has $\phi_o = 0$ and the other, B, has $\phi_o = \pi$. In case A, the beam is polarized along the x axis with an intensity of each component given by:

$I_A = \xi_A^2 = \alpha^r/(\beta^r + \phi^r)$ and a frequency given by a solution of $\alpha^i - (\beta^i + \theta^i)\xi_A^2 = 0$.

This is as expected, as the y axis was chosen to coincide with the anisotropy of the cavity and no modulation should appear in any of the parameters of the laser when the mode is polarized along the x axis.

In the other case B, the laser is polarized along the y axis with an intensity of each component given by:

$I_A = \xi_B^2 = [\alpha^r + 2(\epsilon_w + \epsilon \cos \phi_f)]/(\beta^r + \phi^r)$ and a frequency given by a solution of $\alpha^i + 2\epsilon \sin \phi_f - (\beta^i + \theta^i)\xi_B^2 = 0$.

Again as expected, the characteristics are modified if the mode polarization is along the y axis. Varying the frequency of the laser, by scanning the laser length, varies the phase of the feedback since $\phi_f$ equals $2\omega D/c$, where D is the optical length between the output mirror and the optical component providing feedback (components 14b, 22 in FIG. 1).

Figure 3:
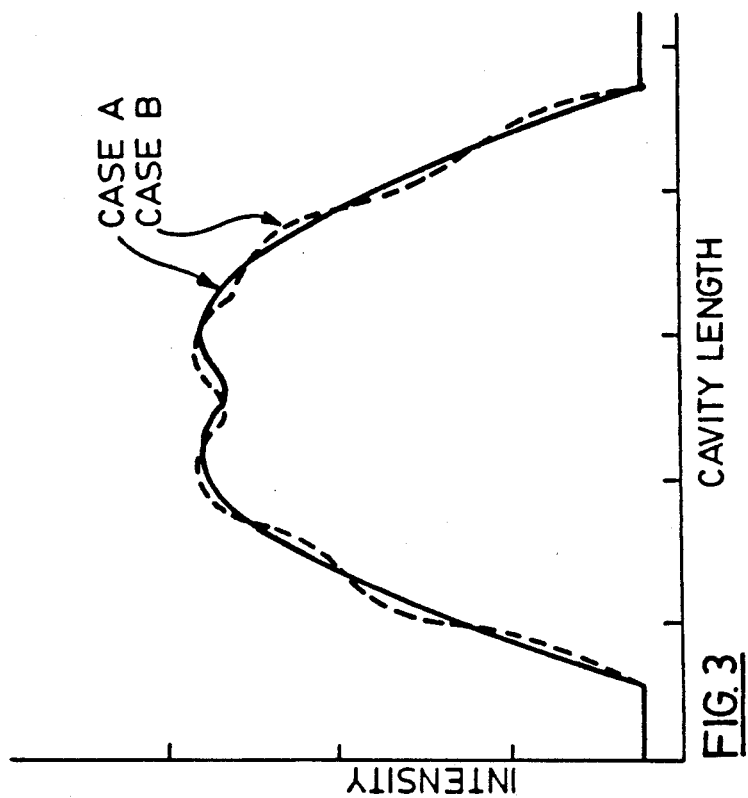
FIG. 3 shows another graph of variations of intensity with cavity length.

FIG. 3 shows a sketch of the predicted behaviour of the two solutions for $\epsilon_w = 0$, i.e. a very weak internal anisotropy and D large to show several periods of modulation within the gain profile. As shown in FIG. 3, the intensity for the two cases A, B appears to alternate with one another, as the length of the laser cavity is varied.

A stability analysis was carried out, to determine what modes are unstable at or near the crossing points in FIG. 3, thus causing the laser to switch from curve A to B or vice versa. The stability equation that was derived gives, as a condition for a polarization state to become unstable:

$$0 = \pm 2(\epsilon_w + \epsilon \cos \phi_f) + \left\{ \sqrt{\left[\left(\int^\tau\right)^2 - 4\epsilon^2 \sin^2 \phi_f \pm 4\epsilon \sin \phi_f\right]^\tau} \right\} - \int^\tau$$

Here $\int = \xi_0^2 (\beta - \Theta)$

This stability equation can also be used to explain the hysteresis loop apparent in FIG. 2a and the fact that we have observed a decrease in the size of the loop with increasing laser intensity.

This shows that the device may be engineered to have a small hysteresis loop and then be very sensitive to changes in the feedback. This in turn enables a small control signal to be used to give the necessary change in the feedback, although for high speed switching, it is anticipated that larger changes will be required in the feedback.

Figure 4:
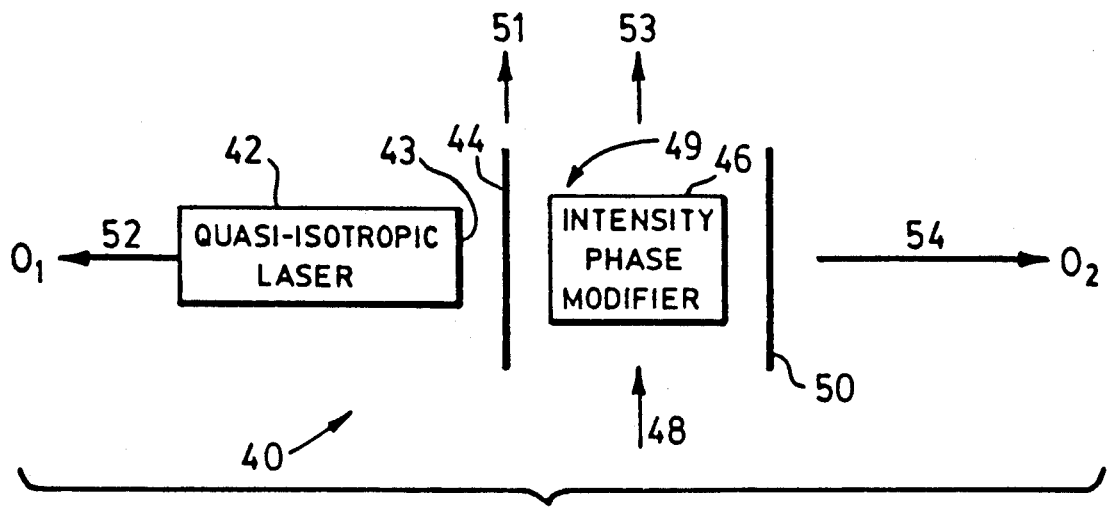
FIG. 4 is a schematic view of a laser device according to the present invention.

Turning to FIG. 4, this shows a laser device incorporating the present invention. The laser device is generally indicated by the reference 40. It includes a quasi-isotropic laser 42, which, in known manner, would include a gain medium and the necessary reflecting elements to form a resonant cavity. At one end, there is a linear polarizing element 44, and on the other side of the polarizing element 44, there is a modifier 46 for modifying the intensity, frequency or phase of the light. Whilst a linear polarizer is shown, it will be appreciated that other types of polarization can be used. An input 48 is provided for the modifier 46, for an input signal. A feedback element 50, which can be a mirror with a certain reflectivity is provided to complete the feedback section 49. The length of the feedback section 49 should be less than half the coherent length of the light. As indicated at 51, 52, 53 and 54 and as described below, the arrangement provides for outputs at either end of the device, or an output at just one end, or from the modifier or polarizer.

In use, the laser 42 operates in known manner. Part of the radiation from the laser passes through the polarizer 44, and through the modifier 46 to the feedback element 50. The feedback element 50 in turn ensures that at least part of this radiation is fed back as polarized feedback radiation again through the intensity, phase, or frequency modifier 46 and through the polarizer 44 into the laser 42. Whilst this embodiment provides for double passage through the modifier 46 and polarizer, this is not essential; the device could be configured to provide for a single pass through the modifier 46 and polarizer 44, in either order.

The strength of the radiation fed back through the polarizer 44 into the laser 42 is comparable or greater than any residual anisotropy in the laser 42. At the same time, the magnitude of the feedback radiation is considerably less than the intensity within the laser itself. Typically, the residual anisotropy of the laser might be $10^{-4}$, so that the level of the external feedback can be quite small.

Thus, in use, the modifier 46 is operated, in dependence upon the input signal provided at 48, to cause the laser 42 to switch between two orthogonal polarization modes. The effect of this is to appear to alter the reflectance (phase and amplitude) of the reflecting element or mirror of the laser 42 adjacent the polarizing element 44, indicated at 43, so that it has different reflectances for radiation parallel to the passing plane of the polarizer for 44 and orthogonal to that plane. For one mode having its polarization parallel to that of the polarizer 44, the modifier 46 is operated so as to effectively increase the reflectivity of the mirror 44 for that mode. The mirror or reflecting element 43 then has a higher reflectivity for that mode, than the other mode orthogonal to the polarizer 44. Similarly, for operation on the other mode orthogonal to the polarizer 44, the modifier 46 is operated to decrease the effective reflectivity of the mirror 43 for radiation parallel to the passing plane of the polarizer 44. The mirror 43 then has a greater reflectivity for the other mode orthogonal to the polarizer 44.

The modifier 46 modifies the phase of the light fed back to the laser 42. The phase shift required may be quite small, typically the order of a few degrees. Consequently, the modifier 46 could be, for example, a Pockels cell. It is then only necessary for the modifier 46 to be a relatively small crystal or which one only needs to apply a relatively small voltage. In other words, in contrast to earlier proposals where the modifying element applies the whole of the shift on the polarization, here the modifier 46 simply applies a small change in the phase of the feedback. Such a small modifier 46 should enable the device to be small and compact. It also has the advantage of requiring a relatively low input signal.

The output from the laser can be taken at either end as indicated at 52 or 54. Where the output is taken at 54, the feedback element or mirror 50 would be provided with a low reflectance, so that just the necessary small quantity of radiation would be reflected back as the feedback. The majority of the radiation from the laser 42 would pass through the feedback section 49 and then through as the output 54.

Another possibility would be to arrange for either the modifier 46 or polarizing element 44 to provide an output. In the case of the polarizing element 44, this could be such as to permit passage of light polarized in one sense, but to eject light polarized in an orthogonal sense along an axis generally orthogonal to that of the whole device. The output 51, unlike outputs 52, 54 would clearly be intermittent, dependent upon the switching of the polarization state. Similarly, the modifier 46 could conceivably be such as to eject or couple out one polarization mode but not the other, as indicated at 53.

It is anticipated that the whole device 40 could be incorporated in a solid state device in which the laser 42 is a striped diode laser, a surface emitting laser diode or a microchip solid state laser. Present stripe diode lasers are generally very anisotropic, but if they could be made suitably quasi-isotropic then they would be suitable.

A surface emitting laser diode is quasi-isotropic and would be suitable. Present teaching on this sort of laser, like much teaching in this field, is that it becomes unstable with feedback, which has been interpreted as intensity competition. In accordance with the present theory, such feedback can be used to make the polarization stable and controllable.

A further possibility would be an ND3+YAG microchip laser or any solid state laser with axial symmetry. These would be very isotropic.

The manner in which the laser 42 is switched between the two different polarization modes could be effected in a variety of ways Thus, this can be achieved by controlling one or more of: the phase of the feedback; the frequency of the laser; the amplitude of the laser; the relative orientation between the external and weak internal anisotropies; frequency of the light fed back into the laser; polarization of the light fed back into the laser; and the gain of the laser.

The above discussion of FIG. 4 has focused primarily on the first of these, i.e. altering the phase of the feedback. An alternative technique would be to keep the section between the reflection means 43 and reflecting element 50 of fixed optical length. Then the frequency of the laser 42 could be varied, e.g. by varying the length of the resonant cavity thereof. This would then have the effect of altering the phase shift and hence cause switching between the polarization modes.

The amplitude of the feedback can be used as a control characteristic. Thus, the laser 42 can have a residual internal anisotropy that favours the polarization mode orthogonal to the polarizer 44. The intensity of the feedback through the polarizer 44 can then be controlled to either override, or not override, this internal anisotropy. Thus, in the absence of strong feedback, the polarization mode orthogonal to the polarizer will be determined by the laser internal anisotropy. On the other hand, in the presence of sufficiently strong feedback, the polarization mode parallel to the passing plane of the polarizer 44 will be present, for the appropriate phase of the feedback.

Another possibility is to control the gain of the laser. As noted above, the width of the hysteresis loop is inversely proportional to the intensity. Thus, by varying the intensity one varies the width of the hysteresis loop. If one has a feedback which places the system at the edge of the hysteresis loop, then varying the intensity can cause the feedback to switch the polarization mode from one mode to the other. Thus, if the system is initially inside the hysteresis loop and the hysteresis loop is narrowed by increasing the intensity, then it will fall outside the hysteresis loop, causing a switching from one polarization mode to the other. However, mere widening of the hysteresis loop again will not cause switching back to the first polarization mode, due to the hysteresis effect, i.e. there is a latching effect. Some other mechanism will need to be used, to reset the system.

The laser device of the present invention is expected to have many applications. In particular, it is anticipated that it will be useful for optical communications. As the device enables the polarization mode to be switched quickly, the anticipated switching time being comparable to the time taken to traverse twice the length of the laser cavity, this gives a possibility of a very high bit rate for data transmission. It is conceived that bit rates as high as 10 Gigahertz or higher could be possible. The transmitted light beam which would alternately switch between the two polarized modes can readily be separated into two polarization states, giving a very high on/off discriminant. The device runs on continuous wave and at constant power, and hence has little frequency chirp.

A further advantage of polarizing the beam, rather than simply switching it on and off as in other laser communication proposals, is that this can automatically provide a verification or confirmation of the data transmitted. Thus, one can separate the two polarization states, and as these are complementary to one another, one can be used as the main data carrier and the other as a check in case there are error bursts in the main transmission. The two states can either be transmitted as a single transmission, or separated and transmitted as two separate signals.

The device can be used for a variety of other purposes where data is encoded. Thus, it could be used for optical recording/reading.

A stabilized polarized output also makes it suitable for use in bar code readers, where this is desirable.

For high power lasers for cutting, e.g. carbon dioxide lasers, the plane of polarization can affect the shape or angle of the cut edge. The present invention can be used to control this plane of polarization to give a desired characteristic to the cut edge. It could also possibly be used with an optical fiber sensor which is used to detect stresses etc. in components of a structure. Some optical fibers have a refractive index that changes with stress, for which it is necessary to use a polarized beam of light.

Figure 5:
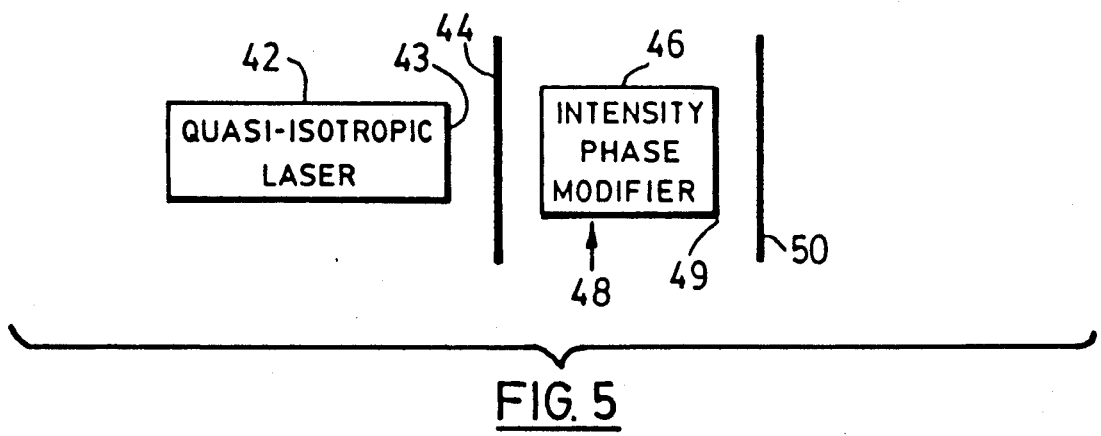
FIG. 5 is a schematic view of an optical oscillator in accordance with the present invention.
Figure 6:
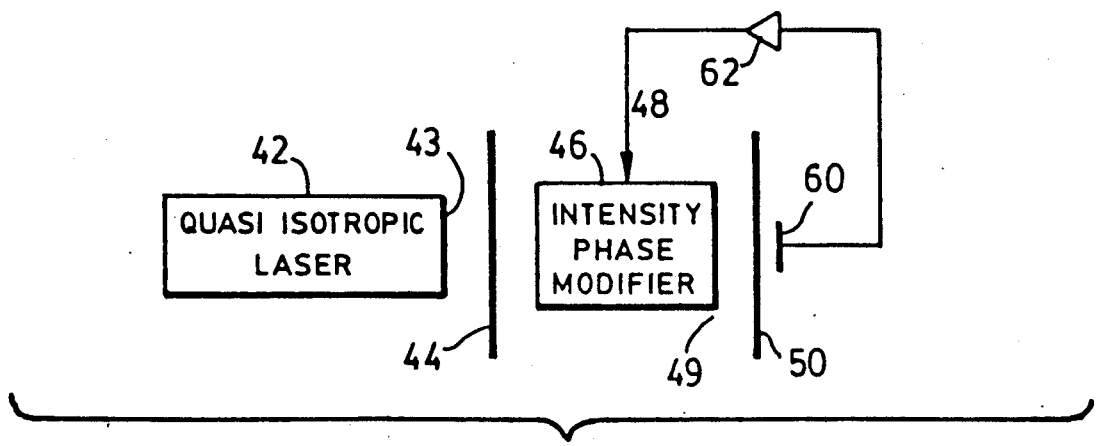
FIG. 6 is a schematic view of a hybrid oscillator in accordance with the present invention.

With reference now to FIGS. 5 and 6, there are shown an optical oscillator and a hybrid oscillator, with like components being given the same reference numerals as in FIG. 4.

FIG. 5 shows an optical oscillator, where the phase of the feedback is determined from the phase of the two modes and the intensity, in accordance with the equation: $\phi_f = a + bE^2$ Where $\phi_f$ is the phase of the feedback, a is the phase of one polarization mode and $bE^2$ is a modification of the phase to give $\phi_f$ for the other polarization mode, and $E^2$ is the intensity within the feedback section 49. The first polarization mode, f1 is parallel to the plane of polarization of the polarizer 44 and hence gives an intensity $E^2$ within the feedback cavity 49; the second polarization mode f2, is orthogonal to the polarizer 44 and hence the intensity $E^2$ equals zero within the feedback cavity 49.

Thus, if the laser device 42 is operating on the second polarization mode f2, then the intensity $E^2$ equals zero so that the feedback phase $\phi f$ will then be equal to a, which can be adjusted so that the laser 42 switches to the first mode. In the first mode, f2, the intensity $E^2$ is present in the feedback section, so that the feedback phase $\phi f$ is then given by the above equation. The intensity $E^2$ and constant b can similarly be chosen so that the laser 42 then switches back to the second mode, thereby giving continuous oscillation.

For the hybrid oscillator shown in FIG. 6, there is provided a photodiode or the like 60 subject to the output 54. This is connected via an amplified and other circuitry 62 to the control input 48 of the modifying element 46. The arrangement is such that a first mode, parallel to the plane of the polarizer 44, is present in the device and the feedback section 49 in the absence of a control signal to the modifying element 46. When a suitable signal is provided to the modifier 46, then the second polarization mode is present, which is orthogonal to the polarizer 44, so that no significant signal is present in the feedback section 49. Thus, if one starts where the first mode is oscillating, then there is a field in the feedback section 49. This is detected by the photo diode 60. The amplifier 62 then provides a signal to the modifier input 48. The modifier 46 then switches the feedback, causing the device to switch to the second mode. Once the second mode is present, then there is no field in the feedback section 49. No signal is detected by the detector 60, and hence no input is provided to the modifier input 48. The modifier 46 is switched off, permitting the device to switch back to the first mode, thereby setting up an oscillation.

A further possible application, assuming that suitable special material would be available for the feedback section 49 is the provision of frequency standards where good discrimination is required.

The above discussion has been based on a device in which the polarization is switched between two mutually orthogonal modes. Another possibility is to provide a modifier 46 which is capable of switching between a number of different modes, e.g. four modes at zero degrees, thirty degrees, sixty degrees and ninety degrees to a main axis. This could be used for a variety of purposes. In particular, for the suggested application for a high power cutting laser, it is desirable to be able to control the plane of polarization as finely as possible. Also, where a number of different polarization states are possible, one can effectively encode more information as the device is not limited to simply switching digitally between on and off states.

We claim:
1. A laser device comprising:
 a resonant cavity having an optical axis and a first reflection means at one end thereof on said optical axis and a second reflection means at the other end thereof on said optical axis, the second reflection means permitting at least some radiation to pass therethrough;

a gain medium within the resonant cavity, the gain medium and the resonant cavity being substantially quasi-isotropic;

a polarizing means disposed on said optical axis outside the resonant cavity;

a modifying means for modifying at least one of the polarization, frequency, phase and intensity of radiation passing therethrough, located on the optical axis; and a third reflection means mounted on the optical axis with the modifying means and the polarizing means located between the second and the third reflection means, to form a feedback section comprising the polarizing means, the modifying means and the third reflection means, the reflectivity of the third reflection means being such that radiation reflected back into the resonant cavity from the third reflection means through the modifying means, the polarization means and the second reflection means provides feedback to the resonant cavity with an intensity substantially less than the intensity of radiation within the resonant cavity, and one of the first reflection means and feedback section enabling radiation to be coupled out of the laser device;

wherein the strength of the anisotropy associated with the feedback into the resonant cavity is greater than any residual anisotropy of the gain medium and resonant cavity but not so great as to cause random behaviour within the device, whereby the feedback section can modify at least one of the polarization, frequency, phase and intensity of radiation fed back into the resonant cavity to effect switching between modes in the resonant cavity which are differentiated by their state of polarization.

2. A laser device as claimed in claim 1, wherein the modifying means comprises a means for providing a phase shift to radiation in the feedback section.

3. A laser device as claimed in claim 2, wherein the modifying means includes an electrical input, for controlling the magnitude of the phase shift provided by the modifying means.

4. A laser device as claimed in claim 1, 2 or 3, wherein one of the first and third reflection means is provided with a sufficiently low reflectivity, to enable an output beam to pass therethrough, and wherein a second polarizing element is provided in the path of the output beam to split the output beam into a first beam polarized in one sense and a second beam polarized in another sense.

5. A laser device as claimed in claim 1, wherein the modifying means is capable of modifying the intensity of feedback radiation in the feedback cavity.

6. A laser device as claimed in claim 5, wherein the resonant cavity and gain medium have an internal anisotropy that is sufficient to maintain a polarized mode, which is polarized at an angle to the passing sense of the polarizing means, and wherein the modifying means and the feedback section can be actuated to either provide a low level of feedback insufficient to overcome that internal anisotropy, or a relatively high level of feedback sufficient to overcome that internal anisotropy and cause the establishment of a polarization mode polarized in a sense parallel or at an angle to the passing sense of the polarizing means.

7. A laser device as claimed in claim 1, wherein the modifying means comprises an electro-optical device for modifying the polarization of the feedback radiation.

8. A laser device as claimed in claim 1, wherein the modifying means comprises an acoustic optical device for modifying the frequency of the feedback radiation.

9. A laser device as claimed in claim 1, wherein the feedback section includes a polarizing device which permits passage of radiation polarized in one sense and which couples radiation polarized in another sense out of the feedback section.

10. A laser device comprising:

a resonant cavity having an optical axis and a first reflection means at one end thereof on said optical axis and a second reflection means at the other end thereof on said optical axis, the second reflection means permitting at least some radiation to pass therethrough;

a gain medium within the resonant cavity, the gain medium and the resonant cavity being substantial quasi-isotropic;

a polarizing means disposed on said optical axis outside the resonant cavity;

a modifying means for modifying one of: the frequency of operation of the laser device; the net gain of the resonant cavity and gain medium; the relative orientation of an internal anisotropy of the resonant cavity and the gain medium relative to the polarizing means; and the frequency of light fed back into the laser, the modifying means being located on the optical axis to effect a change in at least one of the phase, polarization, intensity and phase of the feedback;

a third reflection means mounted on the optic axis with the modifying means and the polarizing means located between the second and the third reflection means, to form a feedback section comprising the polarizing means, the modifying means and the third reflection means, the reflectivity of the third reflection means being such that radiation reflected back into the resonant cavity from the third reflection means through the modifying means, the polarization means and the second reflection means provides feedback to the resonant cavity with an intensity substantially less than the intensity of radiation within the resonant cavity, and one of the first reflection means and the feedback section enabling radiation to be coupled out of the laser device;

wherein the strength of the anisotropy associated with the feedback into the resonant cavity is greater than any residual anistropy of the gain medium and resonant cavity but not so great as to cause random behaviour within the device, whereby the feedback section can modify at least one of the polarization, frequency, phase and intensity of radiation fed back into the resonant cavity to effect switching between modes in the resonant cavity which are differentiated by their state of polarization.

11. A laser device as claimed in claim 10, wherein the modifying means is adapted for modifying the frequency of the laser, and comprises means for varying the optical length of the resonant cavity.

12. A laser device as claimed in claim 10, wherein the polarizing means and the modifying means include means for varying the angle of the passing sense of the polarizing means relative to an internal anisotropy of the resonant cavity and gain medium.

13. A laser device as claimed in claim 3, wherein the input of the modifying means is provided with a signal determined from the phase shifts required for the two polarized modes and the intensity of radiation in the feedback cavity, such that the laser device operates as an oscillator.

14. A laser device as claimed in claim 1 or 10, wherein a photo detector is provided at an output adjacent the third reflection means which is connected to an amplifying means, wherein the modifying means includes a discrete input for controlling the modifying means, which input is connected to the output of the amplifying means, the amplifying means being such that when one of the first and second modes is detected by the photo detector, the amplifying means transmits a signal to the modifying means causing it to switch to the other of the first and second modes, whereby the laser device forms an oscillator.

15. A laser device as claimed in claim 1 or 10, wherein the polarizing means is integral with the third reflection means.

* * * * *